March 28, 1933.　　E. J. KEARNEY ET AL　　1,903,114
MACHINE TOOL
Original Filed Sept. 16, 1929　　3 Sheets-Sheet 1
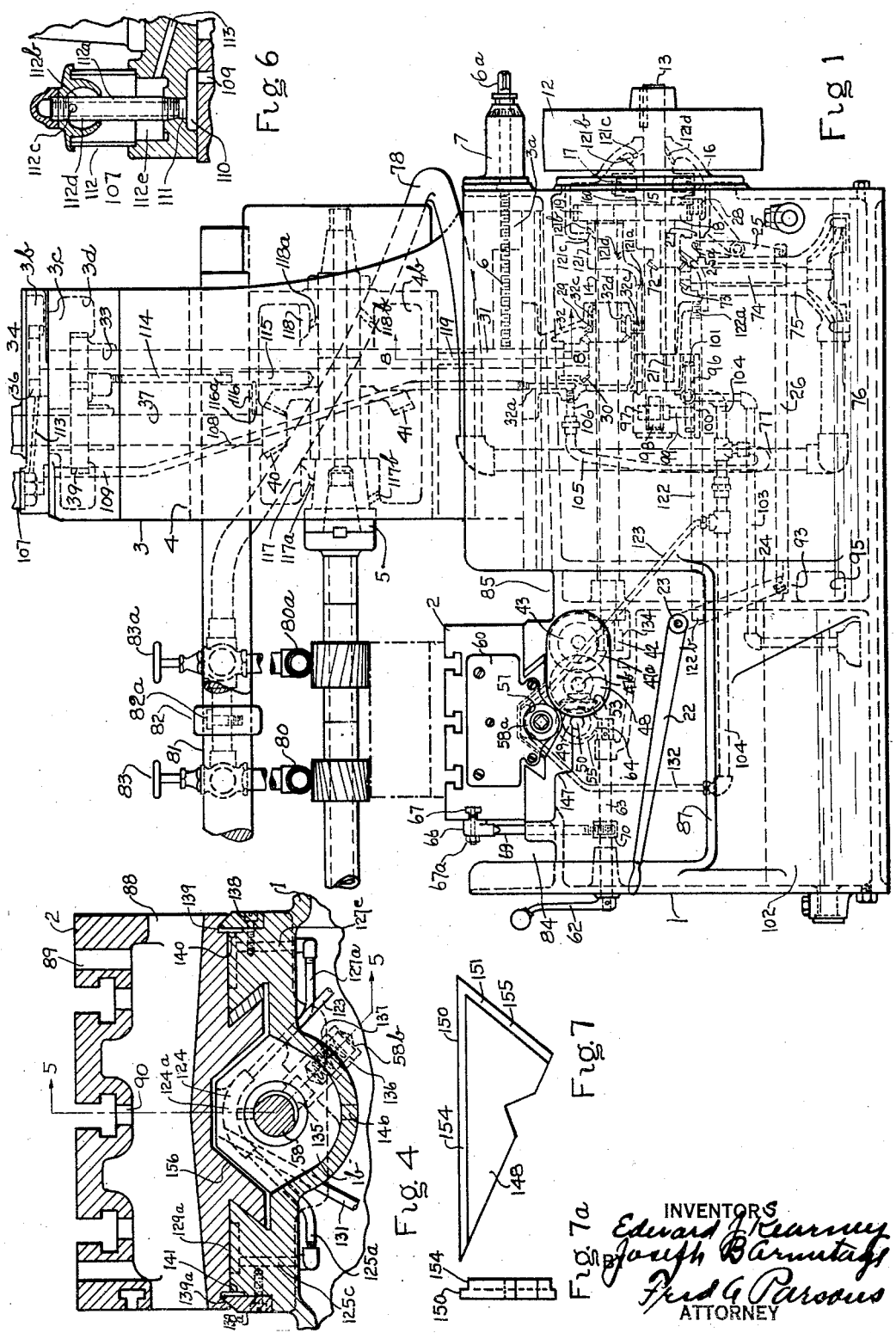

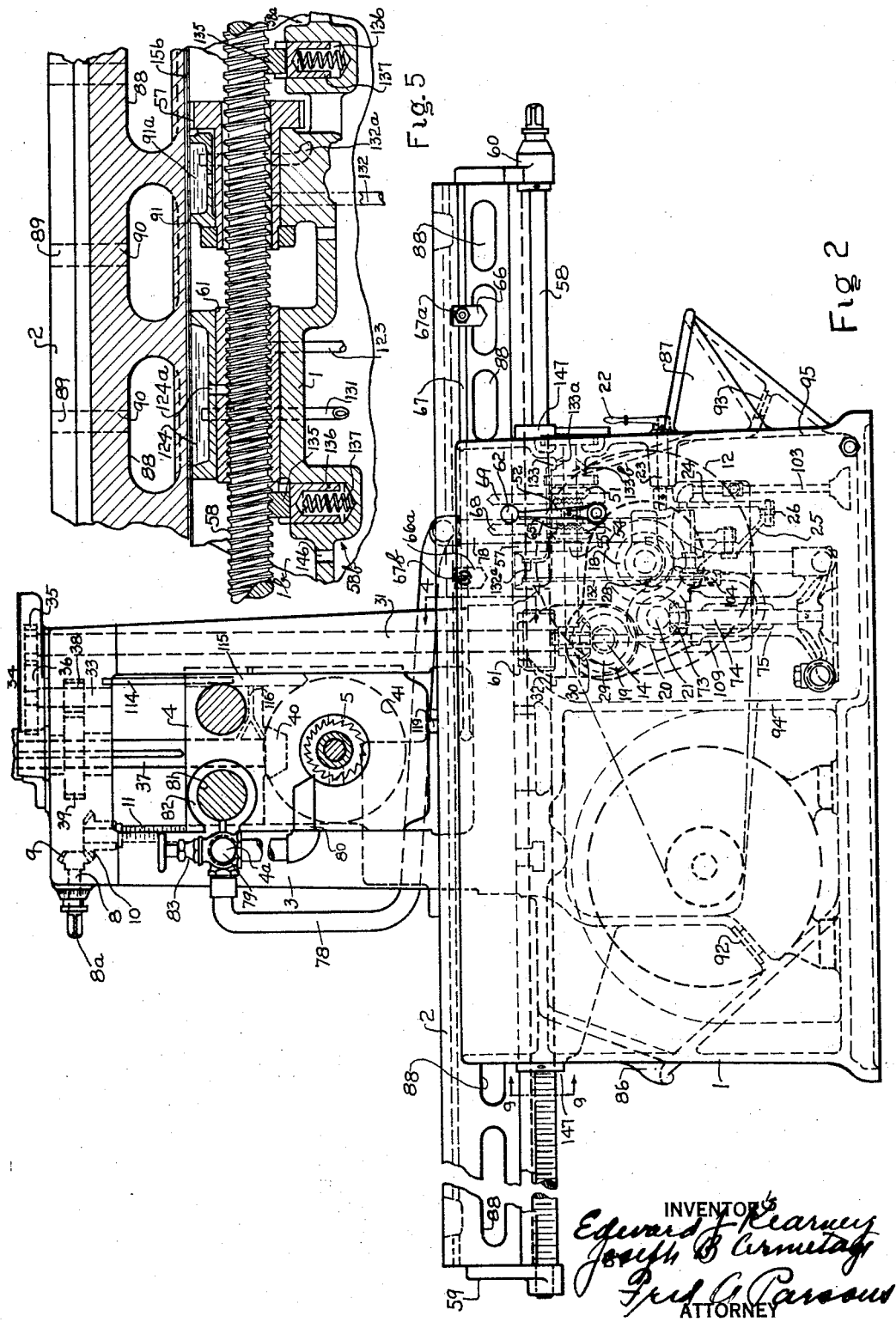

March 28, 1933.   E. J. KEARNEY ET AL   1,903,114
MACHINE TOOL
Original Filed Sept. 16, 1929   3 Sheets-Sheet 3

INVENTORS
Edward J. Kearney
Joseph B. Armitage
Fred G. Parsons
ATTORNEY

Patented Mar. 28, 1933

1,903,114

UNITED STATES PATENT OFFICE

EDWARD J. KEARNEY AND JOSEPH B. ARMITAGE, OF WAUWATOSA, WISCONSIN, ASSIGNORS TO KEARNEY & TRECKER CORPORATION, OF WEST ALLIS, WISCONSIN, A CORPORATION OF WISCONSIN

MACHINE TOOL

Original application filed September 16, 1929, Serial No. 392,805. Divided and this application filed June 1, 1931. Serial No. 541,300.

This invention relates to machine tools and particularly to milling machines including lubricating and cooling fluid systems.

A purpose of the invention is to provide an improved machine having a lubricating system in combination with a system for the circulation of tool or work cooling liquids and to prevent the mixing of the liquids from the different systems.

A further purpose relates to improvements in the lubrication of the driving mechanism of a machine tool table, particularly a milling machine table and more particularly to the lubrication of the screw and slides thereof.

A further purpose relates to improved means for preventing the mixing of foreign substances, cuttings or dust with the lubrication system of a reciprocatory support and to the retaining of lubricant for purposes of lubrication of such a support, and particularly for the guides and immediate actuating mechanism of such a support.

A further purpose is to generally simplify and improve the construction and operation of lubricating systems for machine tools, and still other purposes will be apparent from the specification and claims.

This application is a division of the former application, Serial No. 392,805, filed September 16, 1929, for United States Letters Patent on a machine tool, which application was issued November 17, 1931, as Patent No. 1,832,487.

The invention consists in the construction and combination of parts as herein illustrated, described, and claimed and in such modifications thereof as may be equivalent to the claims.

In the drawings like reference characters have been used to designate the same parts in each of the several views, of which:

Fig. 1 is a right side elevation of a milling machine which includes the invention.

Fig. 2 is a front elevation of the same machine.

Fig. 4 is a partial cross section taken on line 4—4 of Fig. 2 and enlarged.

Fig. 5 is an enlarged partial section along line 5—5 of Fig. 4.

Fig. 6 shows an enlarged vertical section through a device for visibly indicating lubricant flow.

Figs. 7 and 7a are enlarged views of a detail shown in Fig. 9.

Figure 10:
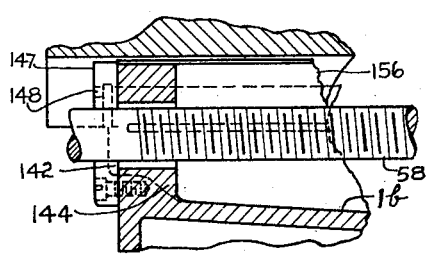
Fig. 10 is a partial longitudinal section taken along line 10—10 of Fig. 9.

The machine includes a base or support 1, a table or work support 2 reciprocably guided on base 1, a head or support 3, guided on base 1 for movement in a path transverse to the direction of movement of table 2, a spindle carrier or support 4 guided for vertical movement relative to head 3, and a spindle or tool support 5 rotatably supported in carrier 4.

The head 3 may be manually moved by means of a screw 6, Fig. 1, journaled in bracket 7 fixed on bed 1, having a squared portion 6a adapted to receive a crank, not shown, and threadedly engaging a nut portion 3a fixed with the head 3.

Carrier 4 may be manually moved by means of a shaft 8, Fig. 2, journaled in head 3 and having a squared end portion 8a adapted to receive a crank, not shown, and upon which is fixed a beveled pinion 9 engaging a bevel gear 10 fixed on a screw 11 journaled in head 3 and engaging a nut or threaded portion 4a fixed with carrier 4.

Spindle 5 may be driven from a power source consisting of a pulley 12, Fig. 1, actuated from any suitable means as for instance from a motor 12a, Fig. 3, housed in base 1, through a transmission as follows: Pulley 12 is fixed on shaft 13, Figs. 1—2, which drives a shaft 14 through a clutch generally denoted by numeral 15 and consisting of a member 16 slidably rotatable on shaft 13 for engagement or disengagement of a friction cone portion thereon with a complementary friction cone portion of a clutch member 17 fixed on shaft 13. A gear 18 fixed with clutch member 16 drives a gear 19 fixed on a shaft 14 through a gear 20, fixed on a shaft 21 whenever clutch member 16 is shifted to engage clutch member 17.

Clutch 15 is manually operable from a hand lever 22, Figs. 1—2, fixed on a shaft 23 upon which is also fixed a lever 24 connected with a pivoted lever 25 by the means of a pivoted rod 26. The lever 25 is slotted or forked to engage a pin 25a fixed on a slidable rod 27 to which is fixed a fork 28 entering an annular groove 16a in the shiftable clutch member 16.

A bevel gear 29, Figs. 1—2, is slidably keyed to shaft 14 and drives a bevel gear 30 fixed on a shaft 31 journaled in head 3, gears 29—30 being supported from a bracket or housing 32, fixed for movement with head 3. Shaft 31 drives a shaft 33, Fig. 2, through a rate changer generally denoted as 34, consisting of interchangeably replaceable gears 35—36 of different diameters. Shaft 33 drives shaft 37 journaled in carrier 4 and bodily vertically movable therewith by the means of a gear 38 fixed on shaft 33 and a gear 39 slidably splined for axial movement of shaft 37 through the gear during movement of the carrier. Shaft 37 drives spindle 5 through a bevel pinion 40 fixed on the shaft and a bevel gear 41 fixed on spindle 5.

Table 2 may be driven from the shaft 14 through a transmission as follows: Shaft 14, Figs. 1—2, rotates at constant speed whenever spindle 5 is rotated and carries a worm 42, which meshes with a worm wheel 43 fixed to a shaft 44. A shaft 45 is arranged parallel to shaft 44 and driven therefrom through a rate changer, generally denoted as 46 and consisting of different diametered interchangeably replaceable gears 47a—47b. Fixed on the shaft 45 is a gear 48, Fig. 3, which drives a gear 49 fixed on a shaft 50. A bevel gear 51 is freely rotatable on shaft 50 and has clutch teeth 51a engageable with complementary clutch teeth 52a of a clutch member 52 slidably keyed to shaft 50. Clutch member 52 may be shifted to engage the complementary clutch teeth, in which case bevel gear 51 transmits through a bevel gear 53 supported on a stud 56 to a bevel gear 54 fixed with a spur gear 55, rotatably supported on shaft 50. The bevel gear 54 has clutch teeth 54a engageable with complementary clutch teeth 52b on clutch member 52 which may be shifted to drive the gears 54—55 directly instead of through the bevel gears 51—53. Spur gear 55 meshes with a gear 57 which is slidably keyed to table screw 58, Fig. 2, whereby the arrangement just described constitutes a reverser for the table screw. The screw is supported for rotation and fixed axially in bearings 59—60 which are bolted to ends of table 2. Screw 58 threadedly engages a nut 61, fixed with base 1 and as the screw is rotated in one direction or the other, the table is caused to feed to right or left relative to tool spindle 5.

Figure 3:
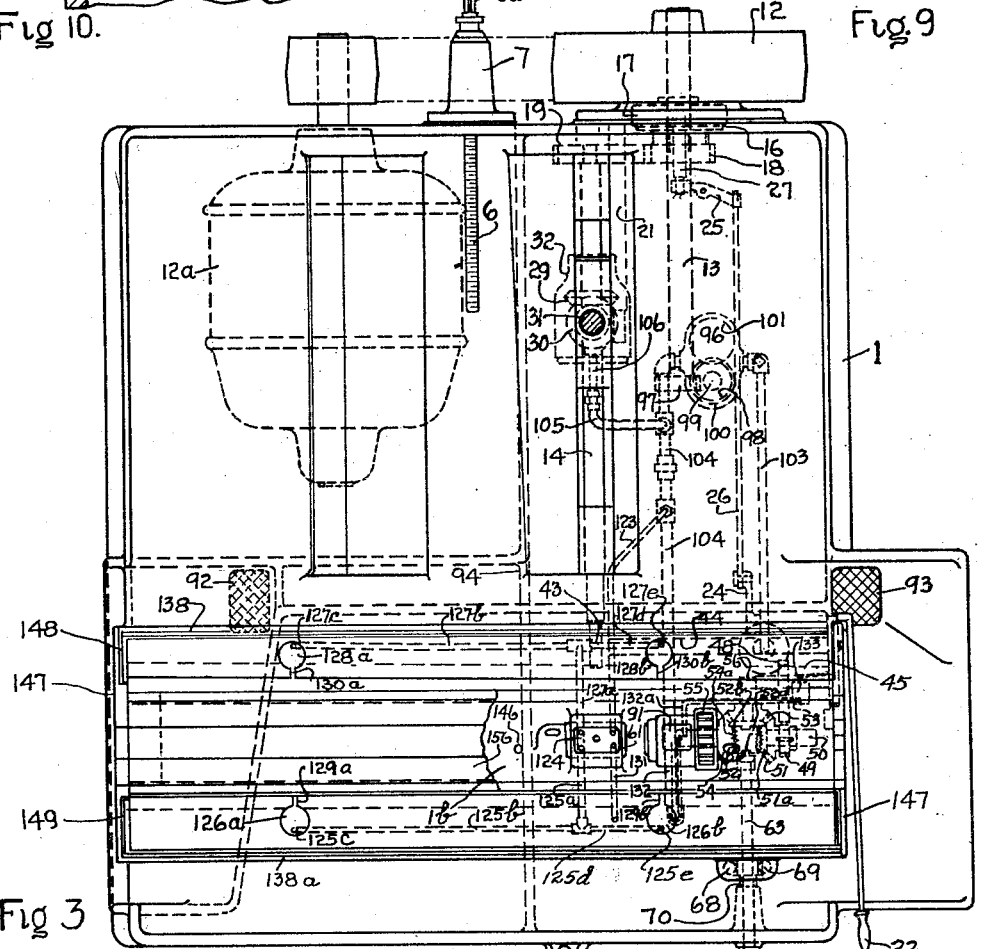
Fig. 3 is a plan view of the base of the machine, the table and spindle carrying head being removed.
Figure 8:
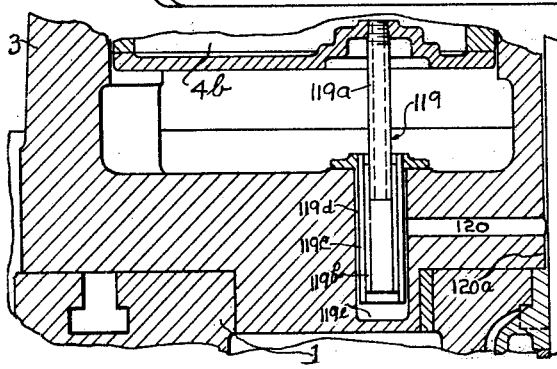
Fig. 8 is a partial cross section taken along line 8—8 of Fig. 1 and enlarged.

The reverser clutch member 52 is manually shiftable by the means of a hand lever 62, Figs. 1, 2, 3, fixed on a shaft 63 upon which is fixed a fork 64 which engages an annular groove 65 in clutch member 52.

The reverser clutch member 52 is automatically shiftable from dogs 66—66a adjustably fixed on table 2 by the means of a T-slot 67 and bolts 67a—67b to contact with one or the other of trip plungers 68—69. These plungers are provided with rack teeth which mesh with a pinion 70 fixed on shaft 63. When lever 62 is moved to engage clutch member 52 for either direction of table travel, one or the other of plungers 68—69 will be raised and whichever of the plungers is in a raised position, will be contacted and forced down by one of the advancing dogs during the table movement. The arrangement is such that a dog moves shaft 63 to disengage clutch member 52 from its clutch engagement in either direction of table travel, whereby to stop the table.

A coolant fluid system for the supply of coolant to the cutters and work is as follows: A centrifugal pump 71, Figs. 1—2, is driven from the spindle drive train through the shaft 21 by the means of a bevel gear 72 fixed to the shaft 21 which meshes with a pinion 73 fixed on pump shaft 74 whereby the pump is actuated only when the spindle rotates. The pump body 75 is fixed with base 1 within which is a coolant reservoir 76 containing coolant into which the inlet passage of the pump is submerged. Piping 77 leads from the outlet port of the pump upward and outside of base 1 connecting by flexible tube 78 and piping 79 with discharge nozzles 80—80a which are supported from an overarm 81 fixed with carrier 4 in which spindle 5 is journaled. For fixing the piping 79 and the nozzles with the overarm there is provided a slotted clamp member 82 having bores to receive the overarm and pipe and contracted to clamp thereon by the means of a bolt 82a. Valves 83—83a in the delivery piping furnish means for checking of coolant supply or for complete shut-off. The fluid thus delivered over the work and cutters flows over the top of the table 2 but is prevented from traveling to the ends of the table which overhang the base by a series of holes such as 89—90, Figs. 4—5, extending from the top of the table into cross passages such as 88, Figs. 2—4—5, which deliver fluid onto the base at the sides of the table, the base being provided with front and rear longitudinal channels 84—85, Fig. 1. The channels 84—85 deliver fluid at each end into end pockets 86 or 87, Fig. 2, at low points of which are screened openings 92—93, Figs. 2—3, from which suitable chanels inside base 1 return fluid to the coolant reservoir 76 to be used again. Such passages are indicated at 95, Fig. 1, for the screened opening 93, and at 94, Fig. 3, for the screened opening 92.

A lubricant fluid system for the supply of lubricant to all the working parts of the machine is as follows: A geared type pump 96 supported from base 1 is driven from the pulley shaft 13, Figs. 1—3, through a helical gear 97 fixed on shaft 13 and a helical gear 98 fixed on the pump shaft 99 upon which is also fixed one of the pump gears 100—101 in the usual manner. The pump 96 furnishes lubricant whenever pulley 12 is caused to rotate. The base 1 provides a lubricant reservoir 102 containing fluid into which extends a suction pipe 103, Figs. 1—2, which communicates with the inlet port of pump 96, and from the pump outlet port extends a main supply pipe or header 104, Figs. 1—2, from which extend various branches or systems for lubrication of different portions of the machine.

A branch system for lubrication of the spindle drive train is as follows: A flexible tube 105, Figs. 1—2—3, receives fluid from the pipe or header 104 and delivers such fluid to a pipe 106, fixed in the bracket or housing 32 which is fixed with head 3. The fluid is forced to a device 107 positioned at the top of head 3, Figs. 1—6, through channels 32a—108—109, Fig. 1, and 110—111, Fig. 6, to a pipe 112a having a number of openings 112b, 112c, 112d, near its top. The fluid passes out such openings and downward over the outside of pipe 112a, where its flow is visible through a transparent member, in this case a glass tube 112, and into a chamber 112e out of which extends a passage 113, which leads to a chamber 3b, Fig. 1, within which are the gears 35—36 and the bearings of shafts 31—33 which are thereby provided with lubricant. From chamber 3b an outlet 3c, Fig. 1, provides communication with a chamber 3d within which are the gears 38—39 together with bearings for shafts 31—33 all of which are thereby lubricated. The fluid is then passed to carrier 4 by a pipe 114, Figs. 1—2, communicating with chamber 3d and extending downwardly into a bore 115 in the vertically adjustable carrier, the pipe and channel providing constant communication on any vertical position of the carrier.

The channels 116 and 116a, Figs. 1—2, provide for lubricating the bearings of shaft 37 and pass the fluid over the bevel gears 40—41 and into a chamber 4b in the carrier. The revolving gears 40—41 throw fluid into pockets 117—118, Fig. 1, which supply the spindle bearings through the channels 117a—118a. The bearings have outlet channels 117b—118b.

From chamber 4b in carrier 4 the fluid is passed to head 3 by means of telescopic tubing 119, Figs. 1—8, consisting of an inner pipe or tube 119a and several collapsible sections 119b—119c—119d, etc. fitted together in the usual manner, from which the fluid passes to a pocket 119e and thence through a channel 120 through the bore 120a provided for shaft 31 and into the hollow interior of bracket 32 through a channel 32b onto gears 29—30. The revolving gears 29—30 throw off lubricant of which a portion is received by an open groove 32c, Fig. 1, to lubricate a bearing for gear 29 having a return channel 32d. By the means described all the gears and bearings in bracket 32 are lubricated.

The fluid then passes from the interior of bracket 32 into a bracket or housing 121, Fig. 1, which carries various gears, shafts, and bearings, there being an upwardly open slot 121a through which the fluid may be passed from a short pipe or nipple 32e in any position of bracket 32 during movement of head 3. The fluid within housing 121 is brought into contact with the revolving gears 18—19, etc., whereby the interior of the housing is filled with flying drops of fluid, some of which will be received in pockets for the bearings such as pockets 121b from which channels such as 121c are led to the bearings, the surplus fluid being returned to the interior of the housing through channels such as 121d.

The surplus lubricant from bracket or housing 121 passes back to the lubricant reservoir 102 through a pipe or channel 122 which communicates at the end 122a with the interior of housing and at the other end 122b empties into the reservoir.

It will be understood that although the oiling means for all the gears and bearings of the spindle train has not been described above in detail, all such gears and bearings are lubricated in each of the various relatively movable frame units by means similar to that described and in a manner such that substantially all surplus lubricant is returned to reservoir 102.

A branch system for lubricating the guide bearings of table 2 is as follows: A pipe 123, Figs. 1—3—5, leads from main pipe or header 104 to a pocket or reservoir 124 in base 1 at a level above the bearings to be oiled. A pipe 125a, Figs. 3—4, receives fluid from reservoir 124 and passes it through pipe 125b and channel 125c to a well 126a and through pipe 125d and channel 125e to a well 126b in the top table bearing at the left of Fig. 4, the wells being fitted with felt and there being grooves 129a, 129b, to deliver some of the fluid to the side left table bearing in Fig. 4. Similarly pipe 127a receives and passes fluid through a pipe 127b and a channel 127c to a well 128a; and a pipe 127d and channel 127e to a well 128b in the top right table bearing and through grooves 130a—130b to the side right table bearing. Also a channel 124a passes fluid to the inner threads of nut 61. An overflow pipe 131, Figs. 3—4—5, returns the surplus from reservoir 124 to main reservoir 102.

A branch system for lubricating various gears and bearings of the feed drive train is as follows: A pipe 132, Figs. 1—3—5, leads from main pipe or header 104 to a pocket or reservoir 91 in base 1 positioned above the bearing for gear 57. A channel 91a leads directly from the reservoir to the bearing of gear 57. Other bearings are supplied from the same reservoir by suitable pipes such as the pipe 132a which delivers fluid to a pocket 133 above the bearing to be oiled. The gears of the train receive surplus fluid which passes out of the bearings along the various shafts and some of such fluid will be cast off from the gears and retained in well 134 beneath worm 42 to lubricate the worm. By means similar to those just described, all the gears and bearings of the feed train are lubricated and any surplus lubricant drops directly back into reservoir 102.

Surplus lubricant is prevented from working along the threads of screw 58 by means of devices generally denoted as 58a, 58b, Fig. 5, which being similar only one will be described in detail. The device 58a consists of a block or member 135 having a portion closely fitted to the threads of screw 58 and permitted to float or move but permanently retained in a slot in a member 136 which is guided for movement toward screw 58 by a suitable bore in base 1 and continuously pressed toward the screw together with member 135, by a spring 137. The devices 58a, 58b, are spaced apart outside the screw portion which receives lubricant, and scrape off surplus lubricant from the screw, such lubricant returning to the reservoir 102 to be used again.

The cooling fluid system previously described floods the top and sides of table 2 with cooling fluid which should not be mixed with lubricating fluid; to prevent such cooling fluid working into the lubricant system the following is provided: Along each longitudinal side underneath table 2 are grooves 139, 139a, Fig. 4. Fixed with base 1 are members 138—138a which extend upwardly into the grooves for the full longitudinal length of the table bearing on each side. Fluid passing down the sides of table 2 will not rise up inside the grooves 139, 139a, but instead will fall outside the strips or members 138—138a into the channels 84—85, Fig. 1, and return to the cutting fluid reservoir 76 through the channels previously described.

Means are also provided to prevent lubricant from passing out of the lubricating system along the table bearing as follows: The base 1 is grooved at 140—141, Figs. 4—9, on the inner side of the strips 138—138a, the grooves extending the full length of the strips underneath the table to receive all lubricant which would otherwise pass out the sides of the table bearings to be mixed with the coolant fluid. At each end grooves 140—141 terminate in a structure which is the same for both ends and will therefore be described only for the left end of the table bearing in Fig. 2. Grooves 140—141 respectively communicate with grooves 142—143, Figs. 9—10, which receive lubricant and pass it through grooves 144—145 to a central channel or groove 1b. Groove 1b terminates at a point adjacent nut 61, Fig. 5, and is there provided with an opening 146, Figs. 3—4, through which the fluid may return to the inside of the base and to reservoir 102.

Figure 9:
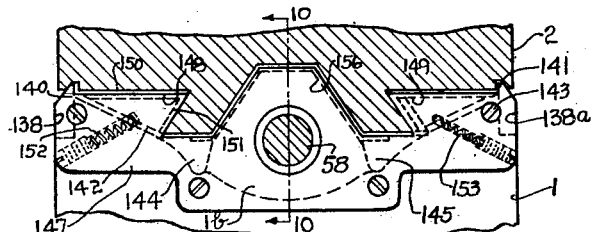
Fig. 9 is a partial cross section taken along line 9—9 of Fig. 2 and enlarged.

The end structure just mentioned also provides means for returning the lubricant which would otherwise pass along the table bearings endwise, which being the same for both ends will be described only for the left end of the table bearing in Fig. 1, as follows: The end grooves 142—143, Figs. 9—10, are in part formed by end plates such as 147, fixed on the base and serving to retain plates or members 148—149. Members 148—149 are similar and one of such members is shown in detail in Figs. 7—7a. Each member is provided with surfaces such as 150, 151, thrust against the bottom and side table bearings by springs 152—153 whereby to scrape off any surplus of lubricant, which drops into grooves such as 154—155 and passes to the grooves 142—143 to be returned to the reservoir 102 as previously described.

The central channels such as 1b and the lubricant pockets or reservoirs such as 91—124, etc., Fig. 5, are provided with a cover member 156, Figs. 5—9—10, fixed with the base underneath the table and extending the full length of the base between the plates 147. The plates 147 are also fitted quite closely to the underside of the table as indicated in Fig. 10, whereby there is substantially no opening through which foreign substances may be received into the table lubricating system.

It is to be noted that although the branch system supplied by pipes or channels 123—132 are at a level materially below the device 107, which visibly indicates the supply of lubricating fluid, the pipes 123—132 or some convenient portion of the fluid supply channels to each of the lower branch systems is sufficiently restricted to insure that a liberal quantity of fluid will rise to the higher level and pass through device 107.

Thus in the case that the flow of fluid is not visible in the device 107, it is a positive indication that the lubricating system is not operating properly and requires refilling of the lubricant reservoir or other suitable attention.

What is claimed is:

1. In a milling machine the combination of a base, a table horizontally reciprocably supported from said base and having bearing surfaces for establishing the path of table movement, a rotatable tool spindle, a carrier for said spindle, a head supported from said base and extended to a level materially above said table bearing surfaces, said carrier being guided from said head for bodily vertical movement, a transmission for said spindle including in the order recited a power source, a main clutch and said spindle, a power train for said table and driven from said spindle transmission at a point between said main clutch and spindle, a lubricant reservoir associated with said base, a pump driven from said spindle transmission at a point between said power source and said main clutch, means visibly indicating a flow of lubricating fluid and supported from said head, a first channel for circulation of fluid between said reservoir and a bearing of said spindle including said pump and also including said means visibly indicating flow of fluid, and a second channel including said pump and adapted to circulate fluid between said reservoir and said bearing surfaces of said table.

2. In a milling machine the combination of a supporting structure, a table supported therefrom for horizontally reciprocatory movement, bearing surfaces associated with said structure for establishing the path of table movement and defined between longitudinally extended side portions, a lubricant reservoir associated with said structure, a power driven pump, a closed channel for the circulation of lubricant fluid between said reservoir and said bearing surfaces and including said pump, and means substantially preventing escape of fluid laterally from said bearing surfaces including a plurality of elements respectively longitudinally extended adjacent different of said side portions and each adapted to prevent movement of fluid past the element in a direction transverse to the extension thereof.

3. In a milling machine, the combination of a supporting structure, a table supported therefrom for horizontally reciprocatory movement, bearing surfaces associated with said structure for establishing the path of table movement and defined between longitudinally extended side portions and laterally extended end portions, a lubricant reservoir associated with said structure, a power driven pump, a closed channel for circulation of fluid between said reservoir and said bearing surfaces and including said pump, means substantially preventing escape of fluid laterally from said bearing surfaces including a plurality of devices respectively associated with different of said side portions and each adapted to prevent lateral flow of fluid past the device, and means substantially preventing escape of fluid longitudinally from said bearing surfaces including a plurality of devices respectively associated with different of said end portions and each adapted to prevent longitudinal flow of fluid past the device.

4. In a milling machine the combination of a supporting structure, a table supported therefrom for horizontally reciprocatory movement, table bearing surfaces associated with said structure for establishing the path of table movement and defined within end and side portions, a screw journaled in said table axially parallel with the path of movement thereof and prevented from axial movement relative thereto, a nut fixed with said structure and threadedly engaging said screw, a transmission for movement of said table and including said screw, a lubricant reservoir associated with said structure, a pump connected to be driven from said transmission, a channel for the circulation of fluid between said reservoir and the nut engaging portion of said screw and including said pump, means preventing escape of lubricant axially along said screw including a plurality of wiping devices each resiliently contacting said screw at different points respectively spaced on opposite sides of said nut, a closed channel for circulation of fluid between said reservoir and table bearing surfaces including said pump, and means associated with said side and end portions of said table bearing surfaces to prevent escape of lubricant from said closed channel.

In witness whereof we have hereto affixed our signatures.

EDWARD J. KEARNEY.
JOSEPH B. ARMITAGE.